Figures 1, 3:
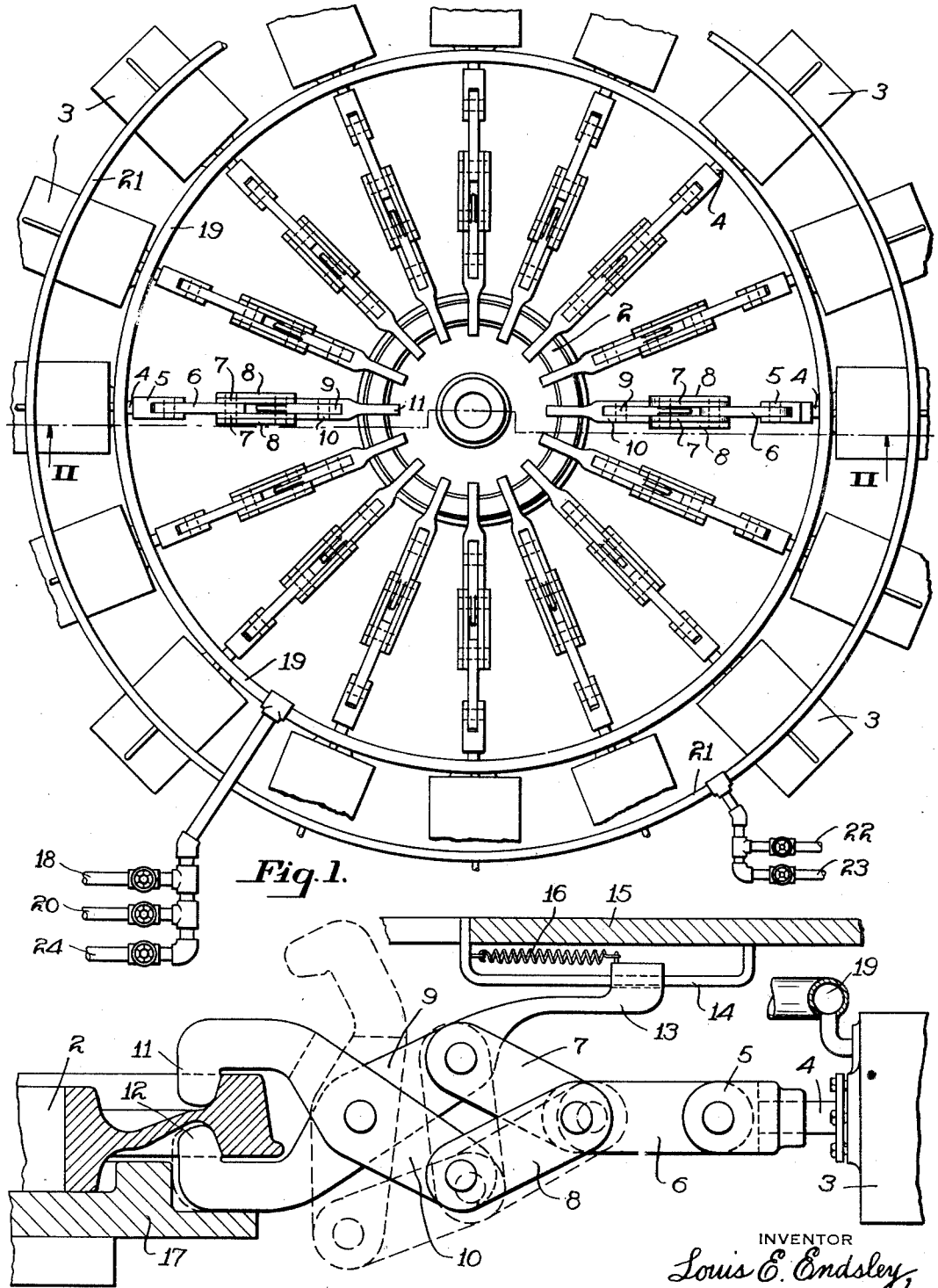

Dec. 5, 1933.     L. E. ENDSLEY     1,937,878
METHOD OF MAKING WHEELS
Filed June 22, 1931     3 Sheets-Sheet 1

INVENTOR
Louis E. Endsley,
By Archworth Martin,
Attorney.

Dec. 5, 1933.    L. E. ENDSLEY    1,937,878
METHOD OF MAKING WHEELS
Filed June 22, 1931    3 Sheets-Sheet 2
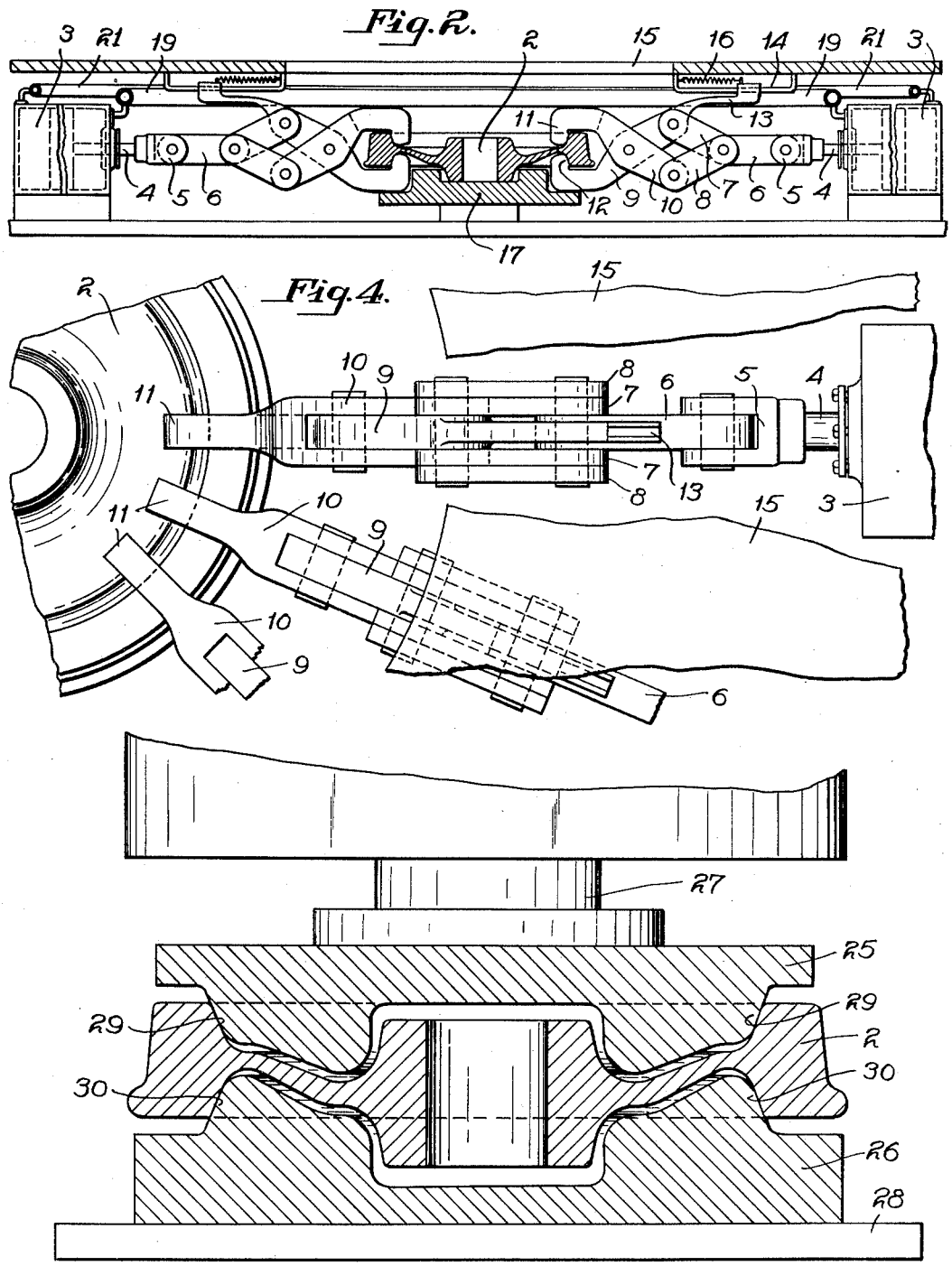

Dec. 5, 1933.  L. E. ENDSLEY  1,937,878
METHOD OF MAKING WHEELS
Filed June 22, 1931   3 Sheets-Sheet 3

INVENTOR
Louis E. Endsley,
By Archworth Martin,
Attorney.

Patented Dec. 5, 1933

1,937,878

UNITED STATES PATENT OFFICE 1,937,878

METHOD OF MAKING WHEELS

Louis E. Endsley, Pittsburgh, Pa., assignor to Edgewater Steel Company, Oakmont, Pa., a corporation of Pennsylvania Application June 22, 1931. Serial No. 546,061

3 Claims. (Cl. 29—168)

My invention relates to a method of and apparatus for forming or operating upon metal wheels, and similarly shaped articles, and is especially useful in the manufacture of railway car wheels, and has for its object the relief or counteraction of stresses created during the unequal cooling and shrinking of wheels.

Railway car wheels of various types are provided with thickened hub portions, relatively thin "plate" portions, and thickened rim or tread portions. The term "plate" as used in the car building art refers to the disc-like portion of a wheel that is formed integrally with and lies between the rim and the hub, and the plates may be either flat or curved.

One manner of forming forged wheels involves the steps of piercing a blank at approximately its central portion and then rolling or otherwise forging the blank, to form the hub, plate and rim portions above-referred to. The hub portion of the wheel will cool much more slowly than the rim portion thereof, with the result that the rim portion will contract in radial directions relative to the hub portion, thereby placing the plate portion of the wheel under compression, and tending to forge the plate into the hub which is still very hot. During this earlier stage, the plate and the rim become much cooler than the hub which, by reason of being much hotter than other points of the wheel, continues to shrink and develops a high tension radially in the plate.

In a standard car wheel of approximately 33 in. diameter, with a 5½ inch tread and 3 inch rim thickness, the shrinkage of the hub will place the plate under very great stresses which may be to the elastic limit of the metal and perhaps to the extent of 60,000 lbs. to 80,000 lbs. per square inch.

Stated generally, my invention contemplates the application of mechanical forces to the rim of either a cast or a forged wheel, in directions radially outward from the center thereof, to such a degree as will overcome and exceed the stresses set up in the plate through cooling and shrinking of the hub. In practising my invention, the rim is stretched radially a sufficient distance to overstrain the plate somewhat above its elastic limit. Release of the stretching or pulling forces will then cause the rim and the plate to retract toward the center of the wheel, but having been stretched beyond its elastic limit in the opposite direction, the metal of the plate will be under much less strain than previous to the stretching operation.

A stretching force of perhaps 3,000,000 pounds, distributed at various points around the rim, of a standard wheel may be applied to effect the stretching or pulling operation, which force would be equal to a change in rim stress or tension of approximately 60,000 pounds per square inch. This force will not overstrain the rim, but only the plate, because the rim is, of course, under a compressive stress after cooling. Wheels treated in this manner have the stresses in the plate therein relieved to such an extent that there is much less danger of fracture, such as occasionally occurs in even those car wheels manufactured according to various accepted practices.

While wheels have been treated by annealing them to effect elimination of stresses set up during cooling of the wheel, this procedure has a softening effect on the tread or rim of the wheel and therefore renders it less resistant to wear.

It has become the practice to roll the rim portion of the forged blanks to a greater extent than the hub portion in order to get a closer-grained structure in the tread of the wheel. This larger amount of rolling of the rim tends to cool the rim faster than the hub, and the increased rolling causes greater stresses than those which would be created where the rolling of the rim was not carried so far.

Car wheels have also been manufactured and heat-treated by bringing up to the desired temperature the whole wheel and quickly cooling the tread surface by either immersing in water or spraying jets of water from a large number of small orifices or nozzles against the tread surface. This quick cooling of the tread hardens it and gives a longer life to the wearing surface, but causes the rim portion of the wheel to contract during the quick cooling, and as the hub and plate are still hot, this contraction forges the plate into the hub, so that when the hub and plate do cool off, the shrinkage due to cooling causes a high tension in the plate of the wheel in the same manner as if the wheel had been forged or rolled and thereafter not heat-treated.

Figure 6:
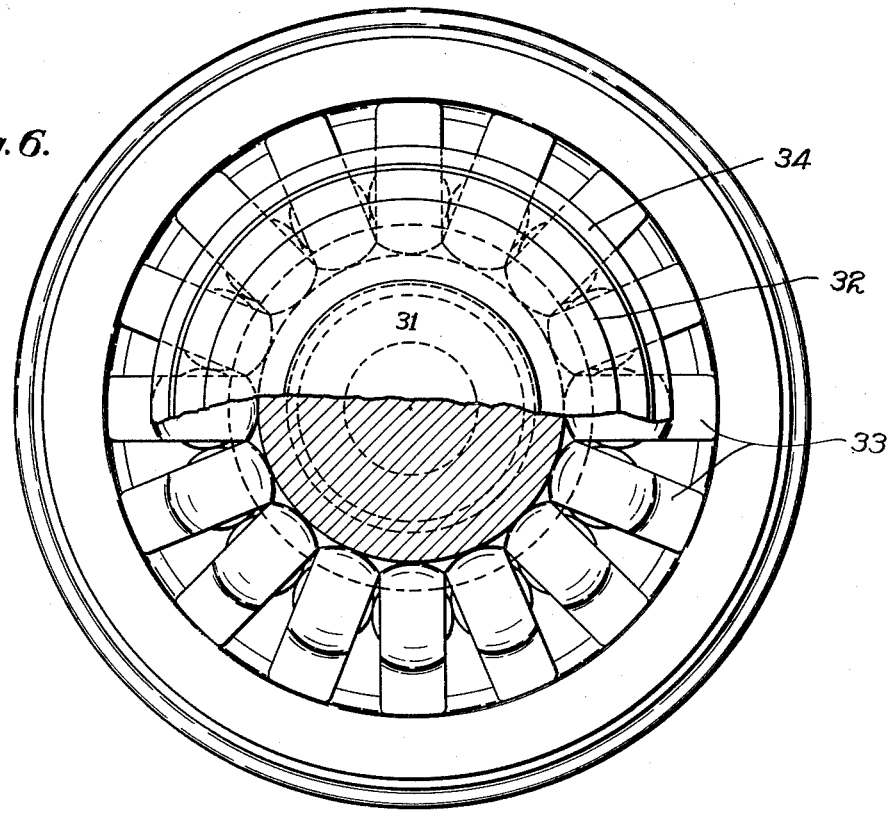
Figure 7:
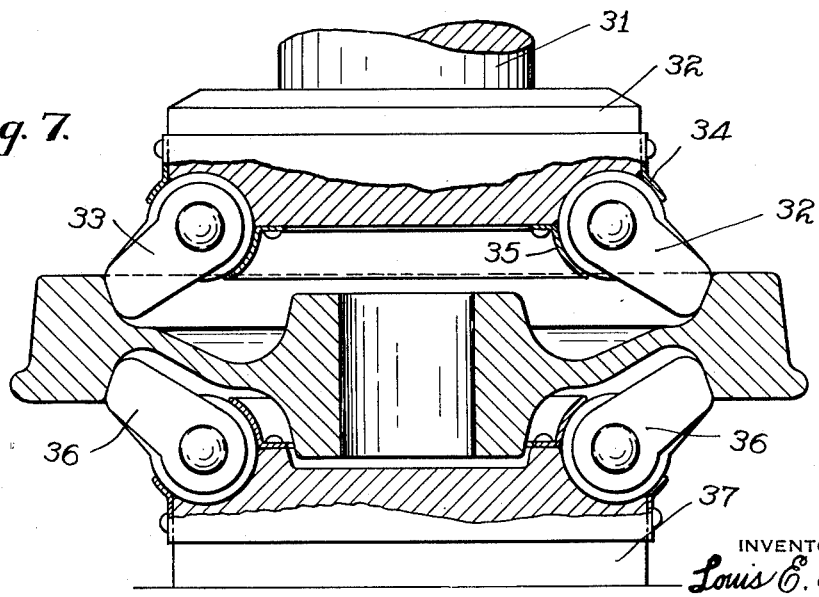

Some forms of apparatus by which my invention may be practised are shown in the accompanying drawings wherein Figure 1 is a plan view of a wheel-stretching device; Fig. 2 is a view taken on the line II—II of Fig. 1; Fig. 3 is a sectional view, on an enlarged scale, of a portion of the apparatus of Fig. 2; Fig. 4 is a plan view of the apparatus of Fig. 3; Fig. 5 shows a modification of the structure of Figs. 1 to 4; Fig. 6 is a sectional plan view showing another modification, and Fig. 7 is a vertical sectional view thereof.

Referring first to Figs. 1 to 4, a rolled or forged car wheel is represented by the numeral 2. Disposed circumferentially of the car wheel are a series of cylinders 3 to which fluid such as liquid or air may be admitted, in any suitable manner, to effect operation of pistons contained therein and their piston rods 4.

Each piston rod 4 carries a bifurcated member 5, to which a link 6 is pivotally connected. Two pairs of links 7 and 8 are pivotally connected to the link 6 and these links are in turn pivotally connected to tong members 9 and 10, respectively, which at their outer ends are provided with jaw portions 11 and 12, adapted to grip the rim of a car wheel in the manner shown more clearly in Fig. 3. The tong 9 has an extension 13 which has a slotted upper end slidably supported on a guide bar 14 which is in turn connected to the underside of an annular plate or base 15. A spring 16 tends to normally hold the tongs toward the center of the wheel so that when the tongs are open as shown in dotted lines in Fig. 3, retractive movement of the piston rod will result in closing of the jaws as hereinafter explained instead of the jaws traveling bodily with the piston as would be the case if the spring 16 or its equivalent were not provided. It will be understood that the various sets of tongs are distributed at symmetrically-spaced points beneath the plate 15.

A table or base 17 is provided for supporting the wheels 2 to be operated upon. With the jaw 11 in the dotted line position shown in Fig. 3, and with the jaw 12 in approximately its full-line position, a wheel 2 is placed on the base 17, whereupon fluid at low pressure is admitted from a pipe 18 and through the conduit 19 to the forward end of each piston cylinder 3. Thereupon retractive movement of the piston rods 4 will be effected, exerting pull on the links 6, 7 and 8.

Since the ends of the tong member 9 are supported by the plates 15 and 17, it is held against pivotal movement and all movement therefore will be transmitted to the tong member 10, causing it to swing from dotted line position to full line position as the links 7 and 8 are drawn toward parallelism with one another.

When the jaws 11 and 12 have been thus brought into engagement with the rim of the wheel 2, supply of fluid from the pipe 18 is cut off, and fluid at higher pressure admitted to the header conduit 19 from a pipe 20. Thereupon pulling force is exerted on all of the piston rods 4 simultaneously, to thereby exert a force that will exceed the elastic limit of the plate portion of the wheel as heretofore explained. The total force exerted through the piston rods 4 will depend of course upon the pounds of pressure supplied from the pipe 20, and this will be gaged according to the thickness or strength of the wheel plate.

While pressure is being supplied from the pipes 18 and 20, fluid is exhausted from the rear side of the piston through a conduit 21 and a drain pipe 22. After the piston rod has been retracted as above-explained, release of the wheel by the jaws is effected by admitting fluid pressure to the rear sides of the pistons from a pipe 23, and through the conduit 21, exhaust being effected at this time through pipes 19 and 24.

This outward movement of the piston rod pushes the jaw 12 against the adjacent shoulder of the plate 17, as indicated by dotted lines in Fig. 3, and thereupon the tong member 10 is caused to swing to the dotted line position, whereupon the wheel 2 may be removed and another wheel placed in position.

The slide bars 14 are made of considerable length so that the tongs may be readily located at various positions to accommodate them to wheels of various diameters.

Referring now to Fig. 5, I show the wheel 2 placed between die-like presser blocks 25 and 26. The upper pressure block is disposed beneath a plunger 27 that is operated by fluid pressure or otherwise, while the block 26 is mounted on a base plate 28. The blocks 25 and 26 have annular bevelled or cam surfaces 29 and 30 respectively, so that when the plunger 27 is forced downward it will exert a spreading force on the rim of the wheel 2 in radial directions, to thereby stretch the plate portion of the wheel, as described in connection with the discussion of Figs. 1 to 4.

In Figs. 6 and 7, I show still another form of apparatus for overstraining the plate of the wheel in radial directions. In this case, a plunger 31 has a head portion 32, to which are pivotally connected presser fingers or bars 33, the bars 33 being held against displacement by curved retaining plates 34 and 35 which may be of sheet metal, and are secured to the head 32 by screws. The plates 34 and 35 preferably frictionally engage the enlarged curved ends of the bars 33, so that the bars will not swing so freely as to permit them to drop to vertical position when they are out of contact with the wheel rim. A lower set of bars 36 are similarly mounted upon a head 37.

It will be seen that when a wheel is mounted in the apparatus as shown in Fig. 7, downward pressure on the plunger 31 through a hydraulic device or other apparatus will cause an outward force to be exerted on the rim for the purpose of stretching the plate of the wheel beyond its elastic limit.

I claim as my invention:—

1. The method of operating on a metal wheel having a hub portion, a rim portion, and a plate portion, which comprises imposing a radially outward thrust on the rim, with sufficient force to exceed the elastic limit of the plate portion.

2. The method of operating on a metal wheel having a hub portion, a rim portion and a plate portion, which comprises imposing a radially outward thrust on the rim, with sufficient force to exceed the elastic limit of the plate portion, but with insufficient force to overstrain the rim portion.

3. The method of treating a metal article of annular contour formed while in a heated condition and having a rim portion, a central portion, and an intermediate portion, all integrally formed, which comprises subjecting the said intermediate portion when cooled to a stretching force sufficient to exceed the elastic limit of the metal.

LOUIS E. ENDSLEY.